United States Patent [19]
Shimai et al.

[11] Patent Number: 5,834,108
[45] Date of Patent: Nov. 10, 1998

[54] MULTI-LAYERED CERAMIC POROUS BODY

[75] Inventors: Shunzo Shimai; Koichi Imura; Ichiro Shibata; Kenichi Okamoto; Akiko Niizuma; Tadayoshi Muto, all of Tokyo, Japan

[73] Assignee: Toshiba Ceramics Co., Ltd., Tokyo, Japan

[21] Appl. No.: 517,412

[22] Filed: Aug. 21, 1995

Related U.S. Application Data

[63] Continuation of Ser. No. 998,031, Dec. 29, 1992, abandoned.

[51] Int. Cl.$^6$ ........................................................ B32B 3/26
[52] U.S. Cl. ..................................... 428/307.3; 428/307.7; 428/312.4; 428/312.6; 428/316.6; 428/318.6; 428/319.1

[58] Field of Search ............................. 428/307.3, 307.7, 428/312.4, 312.6, 316.6, 318.6, 319.1

[56] References Cited

U.S. PATENT DOCUMENTS

| | | | |
|---|---|---|---|
| 4,808,460 | 2/1989 | Chyung | 428/312.6 |
| 4,990,398 | 2/1991 | Fukumoto | 428/312.6 |
| 5,089,134 | 2/1992 | Ando | 428/312.6 |

*Primary Examiner*—Jenna Davis
*Attorney, Agent, or Firm*—Finnegan, Henderson, Farabow, Garrett & Dunner, L.L.P.

[57] ABSTRACT

A ceramic porous body has a layered structure including a plurality of foam-like ceramic layers. The foam-like ceramic layers are formed by firing foam-like ceramic shaped layers each having a thickness of not more than 5 mm. The adjacent shaped layers are joined directly, or bonded via a thin foam-like ceramic layer or dense ceramic layer.

6 Claims, 1 Drawing Sheet

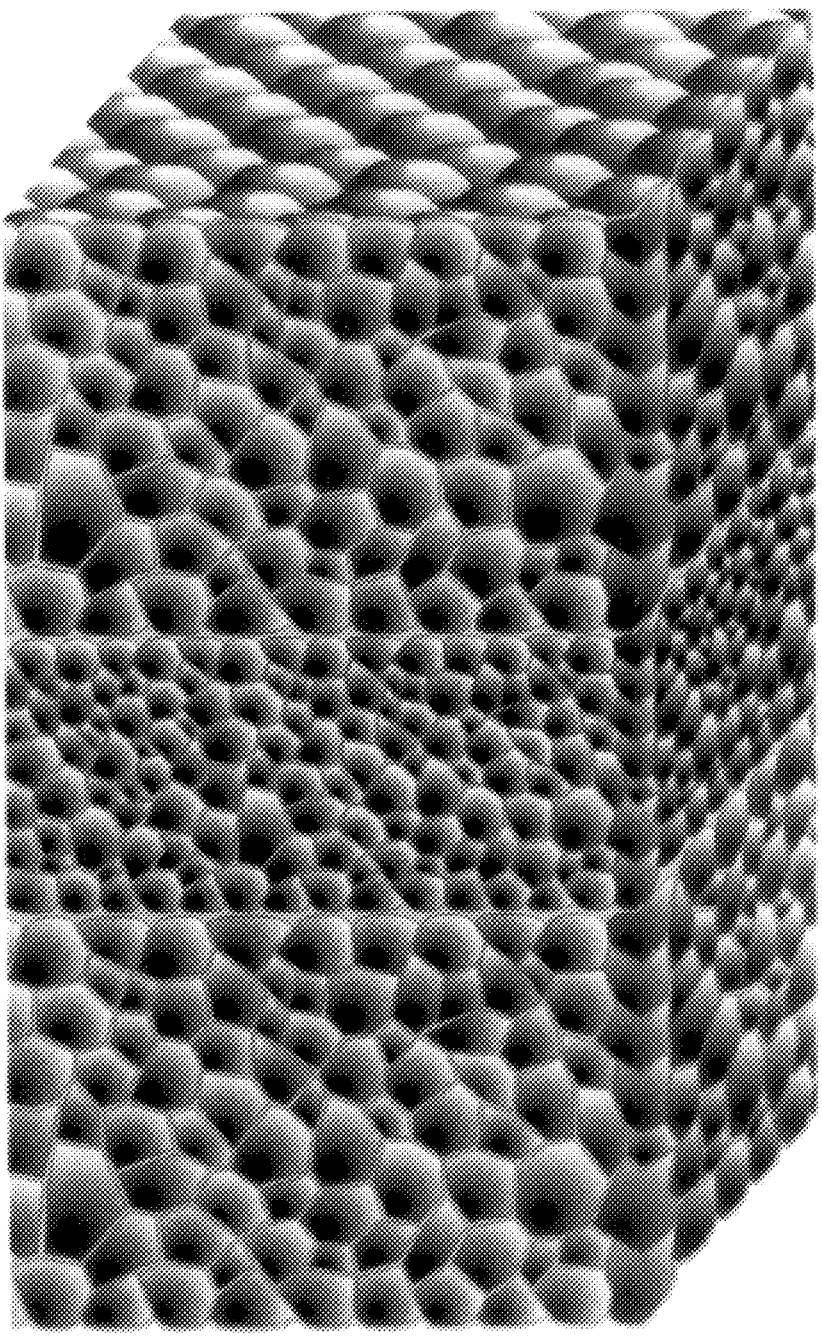

MULTI-LAYERED CERAMIC POROUS BODY

This application is a continuation of application Ser. No. 07/998,031, filed Dec. 29, 1992, now abandoned.

BACKGROUND OF THE INVENTION

The present invention relates to a multi-layered ceramic porous body used for heat insulating materials, filters, catalyst carriers, etc.

Heretofore, ceramic porous bodies have been produced by the following methods.

According to a first method, particles having controlled diameters are charged and sintered in which charging interstices become pores. Ceramic porous bodies produced by this method are refractories, biscuit, etc.

According to a second method, ceramic fibers are mixed with a binder, and heat-treated at a temperature higher than the temperature at which a resultant ceramic porous body is used as a heat insulating material. Ceramic fiber porous bodies produced by this method are applied to porous heat insulating materials for high-temperature use.

According to a third method, ceramic slurry is applied to a polyurethane foam and dried, followed by dewaxing and sintering. Ceramic porous bodies (what is called "ceramic foams") produced by this method have a regular three-dimensional network structure with a porosity of at least 80%, and are used as filters for removing inclusions in metal casting.

According to a fourth method, a ceramic starting powder is mixed with flammable substances, and the mixture is molded and fired to burn off the flammable substances. A ceramic porous body having pores is produced by this method.

According to a fifth method, ceramic slurry is agitated to foam, dehydrated to deprive its flowability, dried, and finally sintered. This method was proposed in Japanese Patent Application Unexamined Publication Nos. Hei. 1-188480 and Hei. 3-54176, the latter being an improvement of the former.

However, the aforementioned methods have the following disadvantages.

The porosity of the ceramic porous body produced by the first method is determined by the natural filling density of powder particles. Therefore, the porosity is in the range of 20–30%, and a higher porosity cannot be obtained. As a further problem, the strength of the ceramic porous body cannot be increased in spite of the low porosity. This is probably because the size of each connection between powder particles is so much smaller than that of individual powder particles (they may be regarded as being connected together at what is called a "neck") that stress concentrates on the neck to reduce the strength.

Ceramic porous bodies produced by the second method are expensive because they are made of high-purity ceramic fibers. In addition, since ceramic fibers are generally poor in sinterability, the ceramic porous body cannot have a high strength.

In the ceramic porous body produced by the third method, pores are generated at locations originally occupied by the polyurethane foam and cracks develop, in association with the pore generation, in ceramic reticula. Hence it is difficult to increase the strength. Further, the cell size of the ceramic foam depends on the technology level of manufacturing the polyurethane foam, and cannot be made smaller than about 0.2 mm. For this reason, the ceramic foam is used only in limited fields.

The strength of the ceramic porous body produced by the fourth method cannot be increased for several reasons, among which the following are notable: the porosity cannot be increased without increasing the contact area of the flammable substances; the thermal expansion coefficient of the flammable substances at the time of heating (firing) is larger than ceramics; and gases resulting from the combustion will blow off. Further, it is practically difficult to mix the ceramic starting material and the flammable substances evenly, which means the pores cannot be distributed uniformly.

Since air is utilized in forming pores in the fifth method, ceramic porous bodies can be manufactured at a very low cost. Further, the cell size of the ceramic porous body can be adjusted as desired by adjusting the intensity of agitating the ceramic slurry to control the expansion ratio.

However, it has turned out that even in the fifth method there exist various problems in the process of pouring the foam-like slurry into a mold and drying it to set the foam. When the foam-like slurry is poured into a mold of a predetermined shape and dried in a drying chamber, drying proceeds from the surface inward. In this process, drying is retarded in the inside because water hardly moves there, whereby bubbles will grow in the inside through their combination. In particular, if it is intended to produce a thick or complexly shaped ceramic porous body, it takes much time to dry the internal foam-like slurry and the internal bubbles grow considerably through their combination. As a result, cracks will develop in the ceramic porous body to deteriorate its properties such as strength and heat insulation.

SUMMARY OF THE INVENTION

The present invention has been made in view of the above problems in the art, and has an object of providing a multi-layered ceramic porous body which has a small pore size, a comparatively uniform pore size distribution and high strength even if it is thick or has a complex shape.

According to the invention, a multi-layered ceramic porous body comprises a plurality of foam-like ceramic layers assuming a laminate structure, the foam-like ceramic layers being formed by firing respective foam-like ceramic shaped layers each having a thickness of not more than 5 mm.

The adjacent foam-like ceramic layers are joined directly, or bonded via a thin foam-like ceramic layer or dense ceramic layer.

BRIEF DESCRIPTION OF THE DRAWINGS

FIG. 1 is a cross-sectional view of the multilayer foam-like shaped body of the present invention showing layers with varying cell sizes.

DESCRIPTION OF THE PREFERRED EMBODIMENTS

A process for producing a multi-layered ceramic porous body of the present invention is described below.

First, ceramic slurry is prepared by adding, to a solvent, a ceramic powder or ceramic particles, a foam stabilizer such as ammonium stearate, a binder such as methyl cellulose, a dispersant such as poly(ammonium acrylate), and other materials. The kind of starting ceramic powder or particles is not limited specifically. The foam stabilizer serves to stabilize foam. The binder serves to increase the viscosity of the slurry to thereby facilitate foaming and strengthen a shaped body. The dispersant serves to improve the dispersability of the ceramic particles in the slurry to thereby provide a stronger ceramic porous body.

In the next step, the ceramic slurry thus prepared is mechanically agitated to foam, i.e., to become foam-like slurry. The bubble size of the foam-like slurry can be controlled by adjusting the agitation intensity. The foam-like slurry immediately after the foaming has uniform bubble sizes. Using the foam-like slurry thus prepared, a foam-like shaped body not thicker than 5 mm is produced as a building block of a multi-layered ceramic porous body.

For example, the foam-like slurry is applied to a flat plate, and then the top surface of the slurry is leveled with a doctor blade, followed by drying in a drying chamber. Thus, a shaped body is prepared. The doctor blade method is suitable for mass production, and therefore can reduce manufacturing costs. Plates having a high heat conductivity, such as an aluminum plate, are preferred as the above flat plate. If the flat plate has a high heat conductivity, the drying of the slurry can be accelerated because the slurry temperature is increased from the flat plate side. Instead of using the flat plate, the foam-like slurry may be applied to the surface of a cylinder that is equipped with a rotating mechanism. A shaped body may be produced by blowing hot air against the slurry coat while rotating the cylinder.

In the above step, the surface layer of the foam-like slurry is rapidly dried to set the foam. As a result, in the setting process the foam-like slurry maintains its as-foamed state, and therefore the diameter of ceramics films of cells (hereinafter called "cell size" or "pore size") is small. Further, more closed cells are created than open cells. However, where the foam-like shaped body is thick, in which case in its interior the drying is retarded and bubbles grow through coalescence, the cell size becomes large. In general (although somewhat dependent on the slurry composition), the as-foamed bubble size is maintained in a layer from the surface to a depth of about 3 mm of the shaped body; it is approximately doubled at a 5-mm-deep position; and it increases to a size more than five times the original size at a 5-mm-deep position. Therefore, in order to insure that the shaped body after the drying has a comparatively uniform cell size distribution, it is preferred that the shaped body be not thicker than 5 mm. Thus, the foam-like shaped body not thicker than 5 mm comprises small cells having a comparatively uniform size distribution.

A multi-layered ceramic shaped body having multiple layers of foam-like shaped bodies is produced in the following manner.

(a) Foam-like slurry is newly applied to a dried foam-like shaped body, and then the surface of the newly applied foam-like body is leveled with a doctor blade, followed by drying in a drying chamber. A shaped body having a predetermined thickness is obtained by repeating this procedure of applying foam-like slurry and drying it.

In this method, in the bottom surface layer (which contacts with the dried shaped body) of the foam-like slurry, water is immediately absorbed by the dried shaped body, and the slurry is dried and the bubbles set rapidly. Therefore, also at the boundaries of the multi-layered ceramic shaped body, the as-foamed state of the foam-like slurry is maintained until the slurry is set, and therefore the cell size is small and more closed cells are produced than open cells. Therefore, this method is advantageous in producing multi-layered ceramic porous bodies having improved characteristics, in particular, higher mechanical strength.

(b) A plurality of foam-like shaped bodies are bonded together with foam-like slurry.

(c) A plurality of foam-like shaped bodies are bonded together with ordinary slurry that will become a dense ceramic member after being sintered.

In each of the methods (a)–(c), a multi-layered foam-like shaped body that is partially different in thickness or has a complex shape can be produced by applying the foam-like slurry only in limited areas or by varying the shape of a plurality of foam-like shaped bodies to be bonded together. Further, the individual layers making up the multi-layered foam-like shaped body may have different cell sizes. Therefore, it is possible to produce, for example, a multi-layered foam-like shaped body in which the cell size is small in the central bonding layer and large in the outer layers as show in FIG. 1. Further, the individual layers constituting the multi-layered foam-like shaped body may have difference chemical compositions as long as their optimum firing temperature and the degree of shrinkage in firing do not vary considerably.

A multi-layered ceramic porous body having a uniform pore size and high strength is finally produced by drying the multi-layered foam-like shaped body to remove the solvent, dewaxing the dried body, and firing it. If necessary, machining may be performed at the intermediate stage, i.e., on the shaped body, calcined body or fired body.

The multi-layered ceramic porous body according to the invention can be used in various fields, and can provide excellent advantages over the conventional ceramic porous bodies.

The use as a heat insulating material is discussed below as a typical example. The heat conductivity of the multi-layered ceramic porous body of the invention depends not only on the starting ceramic material but also on the cell size, cell size distribution, porosity and cell structure (proportions of closed and open cells). Since heat is transmitted by ceramics films, in the use as a heat insulator a higher porosity is advantageous by virtue of an associated small heat conductivity. Further, since at high temperatures a greater proportion of heat transfer is accomplished by radiation, a smaller cell size is advantageous because of an increased frequency of interrupting the heat radiation. It is apparently preferred that the ceramics material itself have a small heat conductivity as exemplified by zirconia. Given, as described above, a small cell size and a high porosity, the multi-layered ceramic porous body of the invention exhibits superior characteristics as a heat insulating material.

As an another example, plate-like multi-layered shaped bodies may be bonded together with foam-like slurry by the above-mentioned method (b) to produce a frame structure having a bottom, which is then fired. A resultant product can be used as, for instance, a crucible for use at high temperatures. Where a tray is formed by the commonly used slit casting of foam-like slurry, a stress occurs in the interior of the shaped body to cause cracks since the solidification at the corners proceeds in two directions when the slurry is dried. In contrast, in a crucible formed by bonding together the plate-like shaped bodies, the internal stress developing in the shaped body is weak.

Further, a multi-layered ceramic porous body formed by combining the porous layers and dense layers by the above-mentioned method (c) can be used as a new functional ceramic body. For example, a multi-layered ceramic porous body having a dense layer interposed between two porous layers can be used as a ceramic heat exchanger by making fluids flow through the two respective porous layers. Further, a multi-layered ceramic porous body in which a dense layer made of ion-conductive ceramics such as zirconia or β-alumina is interposed between two porous layers made of a material capable of being used as an electrode can be used as a solid electrolyte or a sensor.

The present invention is further described below by way of examples.

EXAMPLE 1

A hundred parts of an aluminum powder having an average particle diameter of 0.5 μm and a purity of 99.5%, 0.6 part of stoichiometric spinel, 2 parts of ammonium stearate, and 3 parts of methyl cellulose were put into 30 parts of ion-exchanged water, and stirred with an agitator for 30 minutes, to produce foam-like slurry having a bubble size of 50 μm. This foam-like slurry was applied to an aluminum plate, and its surface was leveled with a doctor blade to provide a shaped body having a size of 480 mm×480 mm×5 mm. The shaped body was dried in a drying chamber at 50° C. A 12-layered foam-like shaped body was produced by repeating the procedure of applying new foam-like slurry to the dried foam-like shaped body and drying the newly applied slurry.

A multi-layered ceramic porous body having a size of 400 mm×400 mm×50 mm (example 1) was finally produced by firing the 5-layered foam-like shaped body in air at 1,800° C. for 2 hours.

For comparison, an alumina-based ceramic porous body having a size of 400 mm×400 mm×50 mm (reference example 1) was also produced by shaping the same slurry into a size of 480 mm×480 mm×60 mm by a single shaping step, drying the shaped body, and then firing it in air at 1,800° C. for 2 hours.

Each of the ceramic porous bodies thus produced was measured for the density, cell size, heat conductivity at 1,000° C., and flexural strength of a sample cut to a size of 20 mm×20 mm×100 mm. The multi-layered ceramic porous body of example 1 had a density of 0.7 g/cm$^3$, a cell size of 50–200 μm, a heat conductivity of 0.2 W/mK, and a flexural strength of 15 MPa. On the other hand, the ceramic porous body of reference example 1 had a cell size of 50–500 μm, a heat conductivity of 0.3 W/mK, and a flexural strength of 10 MPa.

Thus, the multi-layered ceramic porous body of example 1 is superior than the ceramic porous body of reference example 1 in both the heat insulation and mechanical strength.

EXAMPLE 2

A hundred parts of a magnesia-stabilized zirconia powder having an average particle diameter of 1 μm, 2 parts of ammonium stearate, 3 parts of methyl cellulose, 1 part of polyvinyl alcohol and 25 parts of ion-exchanged water were stirred with an agitator for 1 hour to achieve volume expansion by a factor of about 10, to thereby produce foam-like slurry having a bubble size of 100 μm. This foam-like slurry was applied to an aluminum plate, and its surface was leveled with a doctor blade to provide four foam-like shaped bodies each having a size of 300 mm×300 mm×3 mm. The shaped bodies were dried in a drying chamber at 60° C. for 30 minutes.

New foam-like slurry was applied, as a bonding layer, to one of the above foam-like shaped bodies of 3 mm in thickness, and then another foam-like shaped body of 3 mm in thickness was placed on top on the newly applied slurry. A resultant assembly was dried in a drying chamber. In this manner, two foam-like shaped bodies having a thickness about two times that of the original shaped body were produced. Due to little shrinkage during the drying, the size of the foam-like shaped bodies was 298 mm×298 mm×5.8 mm.

Further, new foam-like slurry was applied to one of the foam-like shaped bodies of 5.8 mm in thickness to form a 2-mm-thick bonding layer, and another foam-like shaped body of 5.8 mm in thickness was placed on top of the newly applied slurry layer, i.e., bonded to the first one. A resultant assembly was dried in a drying chamber to provide a foam-like shaped body having an approximately double thickness. After the drying, the foam-like shaped body had a thickness of 12 mm.

The dried shaped body was fired in air at 1,700° C. for 2 hours, to provide a zirconia-based multi-layered ceramic porous body having a size of 250 mm×250 mm×10 mm (example 2).

The multi-layered ceramic porous body of example 2 had a cell size of 50–100 μm. When it was used as a tool material for firing 0.3-mm-thick capacitors, the firing was satisfactorily performed without the occurrence of such an event that products to be fired got stuck in cellular spaces of the tool material.

For comparison, a zirconia-based ceramic porous body (reference example 2) was produced by shaping the same slurry into a size of 300 mm×300 mm×12 mm by a single shaping step, and firing this foam-like shaped body in air at 1,700° C. for 2 hours.

The cell size of the porous ceramic body of reference example 2 was 50 μm in a surface layer on one side and 300 μm in a surface layer on the other side. When this ceramic body was used as a tool material for firing 0.3-mm-thick capacitors, products to be fired got stuck in cellular spaces of the tool material and could not be removed therefrom.

EXAMPLE 3

A hundred parts of an aluminum powder having an average particle diameter of 0.5 μm and a purity of 99.5%, 0.6 part of stoichiometric spinel, 2 parts of ammonium stearate, and 3 parts of methyl cellulose were put into 30 parts of ion-exchanged water, and stirred with an agitator for 30 minutes, to produce foam-like slurry having a bubble size of 100 μm. This foam-like slurry was applied to an aluminum plate, and its surface was leveled with a doctor blade to provide a shaped body of 360 mm in diameter and 5 mm in thickness. The shaped body was dried in a drying chamber at 50° C.

Slurry having the same composition as the above one was stirred with an agitator for 40 minutes to produce foam-like slurry having a bubble size of 40 μm. This foam-like slurry was applied to the above-produced foam-like shaped product, and its surface was leveled with a doctor blade to form a 0.2-mm-thick layer, which was then dried.

Further, slurry of the same composition was agitated for 30 minutes to produce new foam-like slurry having a bubble size of 100 μm. This foam-like slurry was applied to the above-obtained foam-like shaped body, and its surface was leveled to form a 5-mm-thick slurry layer, which was then dried. In this manner, a 3-layered foam-like shaped body was obtained.

A multi-layered ceramic porous body of 300 mm in diameter and 8 mm in thickness (example 3) was produced by firing this foam-like shaped body in air at 1,800° C. for 2 hours.

The multi-layered ceramic porous body thus produced was a disc in which a layer having a cell size of 30 μm and a thickness of 0.2 mm is sandwiched between two layers each having a cell size of 80 µm and a thickness of 4 mm. This could be used as a filter having a pore size equivalent to about 20 µm. In an experiment, it worked as a filter satisfactorily with a small loss in pressure by virtue of its thin filtering portion (intermediate layer).

For comparison, an attempt was made to produce a foam-like shaped body having the same dimensions as the shaped body of example 3 using slurry having a bubble size of 30 µm, no satisfactory shaped body was obtained because bubbles grew to a size of 200 µm.

EXAMPLE 4

A hundred parts of lanthanum oxide having an average particle diameter of 1 µm, 125 parts of chromium oxide having an average diameter of 1 µm, and 100 parts of ion-exchanged water were put into a polyethylene pot together with zirconia balls, subjected to pulverization and mixing for 20 hours, and then dehydrated by filter pressing. A resultant cake was dried in a drying chamber at 120° C. for 24 hours. The dried cake was ground coarsely, and placed in an aluminacrucible, and heated in air at 1,200° C. for 2 hours to form lanthanum chromite. A hundred parts of the lanthanum chromite powder thus obtained and 100 parts of ion-exchanged water were put into a polyethylene pot together with 200 parts of zirconia balls, and pulverized for 48 hours to provide an average particle diameter of 0.5 µm.

On the hand, 100 parts of a zirconia powder having an average particle diameter of 0.5 µm and partially stabilized by 3 mol % yttria, 30 parts of ion-exchanged water, and 0.5 part of poly(ammonium acrylate) were put into a polyethylene pot together with zirconia balls, and the pot was rotated for 20 hours to prepare zirconia slurry.

A hundred parts of the above lanthanum chromite slurry, 2 parts of ammonium stearate, 2 parts of polyvinyl alcohol, and 1 part of methyl cellulose were stirred with an agitator for 30 minutes, to thereby produce foam-like slurry. This foam-like slurry was applied to an aluminum plate, and shaped with a doctor blade into a size 400 mm×400 mm×2 mm. This foam-like shaped body was simply placed in a room for 1 hour so that the fluidity of the slurry would cause open cells.

The separately prepared zirconia slurry was applied to the lanthanum chromite foam-like shaped body to form a 0.5-mm-thick slurry layer, and its surface was leveled with a doctor blade. A resultant assembly was placed in a drying chamber at 50° C. to dry the slurry layer. A shaped body thus produced had a structure in which a dense zirconia film-like shaped body was formed, as an integral part, on the lanthanum chromite foam-like shaped body.

Lanthanum chromite foam-like slurry was further applied to the zirconia film-like shaped body of the above assembly, leveled to form a 2-mm-thick slurry layer, and then dried.

Further, unfoamed lanthanum chromite slurry was applied to the lanthanum chromite foam-like shaped body of the above dried assembly to form a 0.5-mm-thick slurry layer.

A resultant shaped body was fired in air at 1,600° C. for 2 hours to produce a 4-layered ceramic porous body. It exhibited satisfactory characteristics when used as a fuel cell.

As described above in detail, the multi-layered ceramic porous body of the invention has not only a small pore size and a comparatively uniform pore size distribution but also high strength even if it is thick or has a complex shape. In addition, it can be used as functional ceramic members by employing various layer structures.

What is claimed is:

1. A multi-layered sintered ceramic porous body, comprising:

a plurality of ceramic layers assuming a laminate structure, each of said layers having a thickness of not more than 5 mm and comprising an aggregate of cells, each of said cells consisting of a film and a hollow space defined by at least partial enclosure by said film and having a size larger than ceramic particles which constitute said film;

wherein a majority of said cells consist of said film fully enclosing said hollow space; and wherein each of said layers is formed by agitating a slurry including said ceramic particles and then drying said slurry, and said multilayered ceramic porous body is fired.

2. The multi-layered ceramic porous body of claim 1, wherein the foam-like ceramic layers are directly joined together.

3. The multi-layered ceramic porous body of claim 1, further comprising a thin foam-like ceramic layer for bonding together adjacent ones of the foam-like ceramic layers.

4. The multi-layered ceramic porous body of claim 1, further comprising a dense ceramic layer for bonding together adjacent ones of the foam-like ceramic layers.

5. The multi-layered ceramic porous body of claim 1, wherein the foam-like ceramic layers have different cell sizes.

6. The multi-layered ceramic porous body of claim 1, wherein the foam-like ceramic layers have different chemical compositions.

* * * * *